United States Patent

[11] 3,609,292

[72] Inventor Roman F. Arnoldy
 Houston, Tex.
[21] Appl. No. 801,374
[22] Filed Feb. 24, 1969
[45] Patented Sept. 28, 1971
[73] Assignee R. I. Patents, Inc.
 Houston, Tex.

[54] OSCILLATING STRIP BULKWELDING
 10 Claims, 4 Drawing Figs.
[52] U.S. Cl. .................................................. 219/137,
 219/76, 219/130
[51] Int. Cl. ..................................................... B23k 9/00
[50] Field of Search ........................................ 219/76, 73,
 137, 130, 74

[56] References Cited
 UNITED STATES PATENTS
2,848,593 8/1958 Newman et al. .............. 219/73
3,185,814 5/1965 Rossner et al. ............... 219/76
3,264,445 8/1966 Arnoldy ........................ 219/130 X
3,271,553 9/1966 Johnson ........................ 219/76
3,358,115 12/1967 Arnoldy ........................ 219/76

OTHER REFERENCES
Welding Journal, Bulk Welding in 1966 by R. F. Arnoldy, February 1967, pages 117–122

Primary Examiner—J. V. Truhe
Assistant Examiner—George A. Montanye
Attorneys—James F. Weiler, Jefferson D. Giller, William A. Stout, Paul L. De Verter, II, Dudley R. Dobie, Jr. and Henry W. Hope ABSTRACT: The present invention encompasses a method of welding which utilizes in the preferred embodiment a consumable strip electrode having dimensions in the range of approximately one-half inch in width and from 0.001 to 0.015 inches in thickness, and which electrode is moved parallel to the base metal that is being welded. In addition, the strip electrode is oscillated in a path of travel that is generally perpendicular to the parallel movement of the electrode relative to the base metal. A layer of granular alloy material is laid on the base metal in order to give a weld bead having a specific composition with a closely controlled analysis. To achieve an operation having a high capacity with a variety of compositions being available for the weld, the granular material is fed at a granular-to-electrode weight ratio of approximately 1-to-1 to 3-to-1.

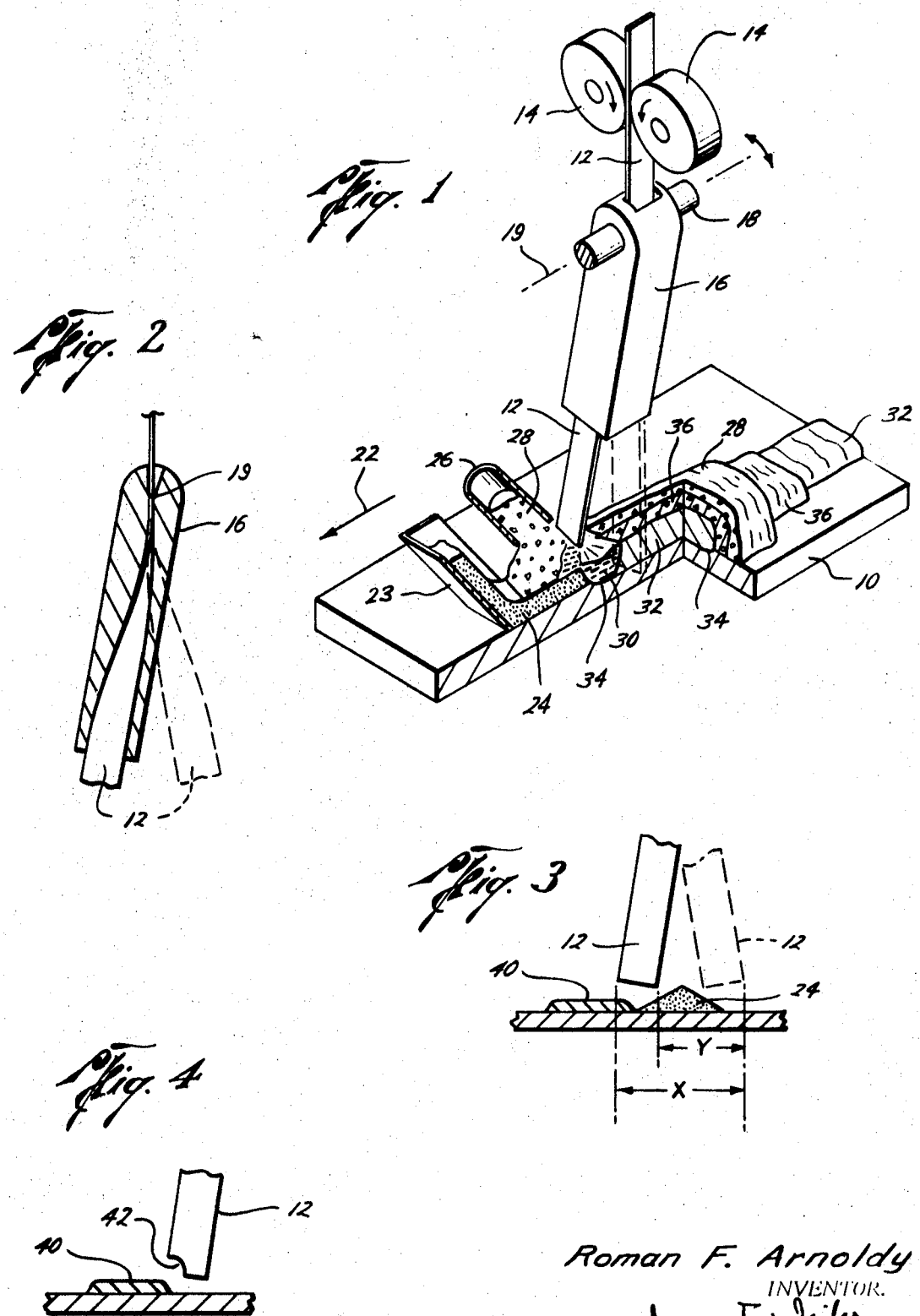
Roman F. Arnoldy
INVENTOR

OSCILLATING STRIP BULKWELDING

CROSS-REFERENCE TO RELATED APPLICATIONS

This invention is related to the welding method set forth in my copending application Ser. No. 807,477, filed on even date herewith and entitled Strip Bulkwelding.

BACKGROUND OF THE INVENTION

The field of art to which this invention pertains is electric arc welding, and more particularly, to electric arc welding in which the weld bead is comprised of melted metal from a consumable electrode and from alloy granules.

"Welding" as used herein includes securing pieces of base metal together, cladding, and the like. "Bulkwelding" as used herein means electric arc welding using a consumable electrode and a layer of granular alloy material laid on the base metal. My U.S. Pat. No. 3,076,888, issued Feb. 5, 1963 and entitled "Method of Producing Weld Coatings or Fusion Welds" illustrates several examples of bulkwelding.

Certain problem areas have existed in such bulkwelding. Although satisfactory results are obtainable with these prior methods, it would, of course, be desirable to eliminate such problems. For example, in the process as disclosed in my above-mentioned patent, the intensity of the arc in certain instances is so high that it penetrates through the granular pile and the weld puddle, even though the electrode is oscillated, Accordingly, this arc would contact the base metal, thereby melting excessive amounts of it and diluting the deposited metal. Since one objective sought in bulkwelding is a weld bead having a known specific composition, the excess melting of the base metal is undesirable.

Prior art devices also utilize a strip as a consumable electrode. U.S. Pat. No. 3,271,553, issued to W. C. Johnson on Sept. 6, 1966, and entitled Overlay Welding, discloses such a method. There still exist certain disadvantages and shortcomings, however, in prior art methods and apparatus which utilize such strip electrodes.

For example, the electrode thickness used in these prior devices requires welding with a light current density and granular-to-electrode ratios of no greater than about 0.5-to-1. The normal bulkwelding ratios of 2-to-1 to 3-to-1 would cause the pile of deposited alloy granular material to extend too far beyond the width of the strip for any welding with a strip less than 2.25 inches. This would be undesirable due to the fact that a portion of the alloy granules might not be melted or at least uniform melting would not occur. Furthermore, the granular pile would be so deep as to make welding it unfeasible or impossible. In addition, the shrinkage stress in the deposited bead is directly proportional to the bead width. Accordingly, the shrinkage stress would be too large in many instances.

A further disadvantage is found in the fact that the low ratio of granular-to-electrode allows a heavy penetration of the base metal with normal currents. This, again, would bring about a dilution of the weld bead. On the other hand, if light currents are used, the deposition rate will be low compared to the usual bulkwelding rate of deposition. In addition, mixing, as required in making an alloy with bulkwelding, is less efficient under the conditions recited above. Finally, the deposited weld bead tends to be low in the centerline area, thus preventing the uniformity desired in the bead.

SUMMARY OF THE PRESENT INVENTION

The present invention utilizes a strip electrode which is consumable along with the alloy granules. The strip electrode utilized has dimensions of approximately one-half inch in width with a thickness ranging from approximately 0.001 inch to approximately 0.015 inch. This strip electrode is moved along the pile of granular material in a first direction which is parallel to the surface of the base metal on which the welding is being performed. In addition, the electrode is oscillated in a second direction which is generally perpendicular to the first direction, the length of the oscillation being approximately equal to the width of the strip. By the use of such an oscillating strip, bulkweld ratios in a range of from 1-to-1 to 3-to-1 can be achieved, while insuring a complete and uniform weld throughout.

The use of the above dimensioned oscillating strip electrode, which achieves the sought for high-ratio welding, gives the wide flexibility desired in the composition of the weld. In addition, this high-ratio welding allows for low penetration of the base metal by the electrical current, and yet, offers the advantage of providing a high-deposition rate—all of this being accomplished by the use of a strip electrode that is significantly smaller than the prior art devices.

The present invention furthermore allows the use of a low-intensity arc concentration on the baseplate which also helps insure a lowered penetration of the baseplate by the arc. It furthermore provides current surges at previously laid weld beads to give sound welds in tie-ins with these beads. The present invention allows the use of a naturally shaped granular pile as produced by automated meter feeding equipment which deposits the granules directly on the base. Finally, the efficient and accurate mixing found in bulkwelding is still available with the present method.

It is, therefore, an object of the present invention to utilize a relatively small, oscillating strip electrode with granular deposition bulkwelding.

Still another object of the present invention is to utilize a preferred embodiment of the strip electrode having dimensions of approximately one-half inch in width by approximately 0.001 to 0.015 inch in thickness, whereby a high ratio of granular to electrode welding may be achieved without excessive granule piles or excessively high currents being required.

Another object of the present invention is to provide a method of welding which will create current surges as it nears previously laid welds so as to create sound welds in these important tie-in areas.

Yet another object of the present invention is to provide a welding method with which bulkwelding ratios may be used to allow the making of a weld having a desired composition, and yet which allows for a high-deposition rate.

Another object of the present invention is to provide strip electrode bulkwelding which has relatively low penetration of the baseplate by the electrode current, whereby there will be little dilution of the weld.

Still another object of the present invention is to provide such a method which will use relatively simple apparatus for the performance thereof, most of the apparatus being previously used prior art apparatus.

Other and further objects, features and advantages will be apparent for the following description of the presently preferred embodiment of the invention, given for the purpose of disclosure, when taken in conjunction with the accompanying drawing.

BRIEF DESCRIPTION OF THE DRAWING

In the attached drawing, like character references designate like parts throughout the several views, which views are as follows:

FIG. 1 is a partial, perspective view, partially in section, of a weld being applied pursuant to the present invention, FIG. 2 is a side view, in section, of a nozzle through which the strip electrode is fed, FIG. 3 is an end view of a granular material deposited adjacent a previously laid bead, and FIG. 4 is an end view of a previously laid bead in relation to the oscillating strip electrode.

BRIEF DESCRIPTION OF THE PREFERRED EMBODIMENT

Turning now to FIG. 1, the numeral 10 indicates the baseplate on which the bulkwelding is to be performed, and the numeral 12 refers to the strip electrode utilized with the present invention. This strip electrode is fed through a weld head (not shown) which weld head is well known in the art. By way of example, however, a typical weld head for another form of bulkwelding is shown in my copending application Ser. No. 734,990, filed June 6, 1968, now U.S. Pat. No. 3,517,156, and entitled Welding Apparatus and Method. This shows a typical means for feeding the electrode strip to the arc zone. The tubes for conveying the granular material, of course, feed from hoppers or bins containing a supply of the respective materials. Rollers 14 are connected to the weld head and are used to feed the electrode 12 to the arc zone at a controlled rate of speed. The direction of rotation of the rollers are shown by the arrows on the respective rollers.

Referring now to FIGS. 1 and 2, a nozzle 16 is shown which is used in this embodiment to provide the oscillating motion for the electrode 12. This nozzle is rotatably mounted about a shaft 18 which, as with the rollers 14, is connected to the weld head. This shaft 18 is oscillated by any conventional means (not shown), and the nozzle axis is fixedly attached thereto for rotation therewith. A nozzle axis of rotation 19 is defined by the centerline of the shaft 18. It is understood, of course, that the nozzle 16 moves in an oscillating manner through a limited arc as defined by the arrow 20 in FIG. 2. The length of this arc may be varied by suitable adjustment of the means which oscillate the shaft 18. Limit means should also be provided to provide control over the length of the arc through which the nozzle travels.

By comparison of FIGS. 1 and 2, and referring primarily to FIG. 2, it can be seen that the electrode 12 is fed through the rollers 14 in such a manner that its width is generally parallel to the direction of travel of the weld head illustrated by the arrow 22 shown in FIG. 1. The electrode is fed at least to, and if desired through, this axis 18 with its width remaining generally parallel to the motion of travel of the weld head. At the axis 18 or at a point below this axis, the electrode is twisted approximately 90° as best shown in FIG. 2. Accordingly, as it issues from the bottom of the nozzle 16, its width is generally perpendicular to the path of travel of the weld head.

It is, of course, not necessary to the present invention that the electrode be fed as shown in this embodiment. It has been found, however, that the desired oscillation of the electrode may be more readily imparted thereto by the feeding of the electrode in this manner. Thus the electrode can be pivoted about an axis extending through its width, and then twisted into the desired position relative to the pile of granular material. Due to the small size of the electrode that may be used with the present invention, the oscillating and the twisting of it is easily preformed in the manner previously prescribed. As an alternative method, however, the entire feeding apparatus could be oscillated, and thereby avoid the twisting of the electrode.

Returning now to FIG. 1, a tube 23 is connected to the weld head and conveys the granular material 24 onto the surface of the baseplate 10. A following tube 26 conveys the flux 28 to a position covering the deposited granular material 24.

In operation, an electric arc is created between the electrode 12 and the granular material 24. This creates an arc zone generally indicated by the numeral 30 in FIG. 1. The granular material is melted in this arc zone, as is a portion of the consumable electrode strip 12. It is this mixture of material that combines to form the solidified weld bead 32. In addition, a portion of the base metal 10 is melted as at 34. It is desirable in a welding operation of this type to have a certain amount of melting of the surface of the baseplate so that the overlay or bead 32 can achieve a more secure bonding with the baseplate 10. Of course, a portion of the flux 28 will also become molten in the arc zone and will then solidify into a covering layer, as at 36. The remainder of the flux remains in its granular state.

This general welding operation is well known in the art as is the weld head which is not shown in this application.

In prior art methods that are somewhat similar to the present invention, the strip typically used would be 1½ inches in width and would have a thickness of approximately 0.030 inch. The present invention utilizes a substantially smaller strip which typically runs one-half inch in width, with a thickness of approximately 0.015 inches This strip width may vary up to about 2 inch and the thickness may vary downwardly from approximately 0.015 to approximately 0.001 inch.

One advantage achieved by the present invention is that it can utilize a pile of granular material as fed by a prior known feeding device. A typical pile of granular material 24 as fed from such a device is shown in an end section view in FIG. 3. Since the outermost portion of the pile would exceed the width of the relatively small strip, the strip is oscillated as shown also in FIG. 3, as well as in other figures.

The width of the oscillating motion of the electrode varies depending upon the size of the granular pile, size of electrode used, characteristics of weld bead desired, type of material making up the granular material, etc. Under normal conditions, the distance of oscillating travel of the electrode would be a distance equal to the width of the electrode strip. If this distance of travel were not equal to the strip width, the center of the weld bead would receive more overlapping of the electrode than would the outermost edges. This is, however, acceptable for certain jobs. This distance of oscillating travel is defined for purposes of this application as being the total distance traveled by any point on the lowermost tip of the electrode through one swing of the electrode in one direction only, and is illustrated in FIG. 3 by the letter Y. Taking by way of example an electrode of one-half inch in width and the distance traveled Y of one inch, the total distance covered by the outer extremities of the electrode during its oscillating motion would be represented by X in FIG. 3. Accordingly, in our example X would equal 1½ inches. Where the distance traveled Y is one-half inch, the total distance X covered by an electrode of one-half inch in width would equal 1 inch. In this latter example, the coverage of the weld bead by the electrode would be even as was previously printed out, resulting in a more uniform bead throughout its width.

Such conditions as the distance of oscillating travel, width and thickness of the electrode may be varied as necessary to achieve the best results under differing conditions.

By the previously described method of bulk welding, the advantages and objectives set for at the outset are achieved. In order to illustrate these advantages and to show that the objectives set forth have been achieved, two examples will now be given, the first dealing with a prior art method of applying weld beads. This method is one which will be similar to that disclosed in the previously mentioned Johnson U.S. Pat. No. 3,271,553. The second method discloses results obtained with the present invention and under similar conditions to example I.

EXAMPLE I

In this first example, the strip utilized in the prior art method measured 1½ inches in width and 0.030 in thickness. This method utilized an unoscillated strip, although the extremities of the strip in this prior are method covered as much distance (as defined by the term X in FIG. 3) as did those of the oscillated strip of the present invention. The results obtained are as follows:

| | |
|---|---|
| Amperage | 1,000 a. |
| Voltage from electrode to granular pile | 30 volts |
| Rate of travel of welding head | 10 inches/min. |
| Granular-to-electrode strip ratio | 0.5-to-1 |
| Thickness of granular deposit | 3/16ths inch |
| Deposition rate | 45 pounds/hour |
| Deposition rate per 100 amps | 4.5 pounds/hour |

EXAMPLE II

In the method used as defined herein, the strip electrode employed measured one-half inch in width by 0.015 inch in thickness. The results obtained are the following:

| | |
|---|---|
| Amperage | 500 a. |
| Voltage | 35 volts |
| Rate of travel | 13 inches/min. |
| Granular-to-electrode ratio | 3-to-1 |
| Thickness of granular deposit | 3/16ths inch |
| Deposition rate | 60 pounds/hour |
| Deposition rate per 100 a. | 12 pounds/hour |

The oscillating width utilized in this example was one inch, thereby covering a total area of 1½ inches which, as mentioned, is equal to the width of the unoscillated strip utilized in Example I. The frequency of the oscillation was 75 oscillations per minute (OPM).

As can be seen by a comparison of the conditions and results in the above two examples, the method as disclosed therein achieves a deposition rate per 100 amps of 2.66 times the deposition rate achieved by the prior art method. This is done with half the amperage required for the prior art method and with a substantially smaller electrode. A significant increase in the deposition rate is made by the method as disclosed herein over the prior art method, this increase being achieved with the substantially smaller electrode. More importantly, the larger granular-to-electrode ratios desired in bulk welding can be achieved with this method. This makes available a greater variety of compositions for the makeup of the weld bead without the disadvantages outlined at the outset such as using excess current, with heavy penetration of the base metal; or on the other hand, using a current that is too light with the resulting decrease in deposition rate. A uniform bead is achieved with the present invention having no lowered cross-sectional configuration in the centerline area of the bead. No preformed pile of granular material is required in order to achieve acceptable penetration patterns by the arc. Proper mixing is achieved with the wider variety of compositions available for the weld bead.

One additional advantage of the present invention is that of providing current surges as the electrode approaches previously laid beads. As can be seen in FIG. 3, a new overlay may be positioned adjacent and parallel to a previously laid bead 40. The weld head is moved parallel to the bead 40 (as illustrated by arrow 22 in FIG. 1), and the granular 24 along with the flux 28 is deposited adjacent thereto. For simplicity of illustration, the flux 28 is not shown in FIG. 3 and the granular material 24 or the flux 28 is not shown in FIG. 4. It is understood, however, that they will be positioned adjacent and parallel to the bead 40.

In operation as the weld head moves forward, the electrode strip 12 begins its oscillating movement towards and away from the previously laid bead 40. As it approaches this previously laid bead (as shown in FIG. 4), a current surge occurs between the electrode strip 12 and the bead 40. Such a current surge is achieved due to the oscillating movement of the strip electrode 12 which brings it closer to the previously laid bead. This current surge will consume additional amounts of the strip 12, as in 42, and will create a more intense welding arc in the area of the tie-in between the old bead and the new one. Accordingly, the previously fused bead will again achieve a molten state and a more secure fusion between the previously laid bead 40 and the bead being laid in the present operation will be achieved. Such current surges at these important tie-in areas help to provide a more sound weld in these areas.

Accordingly, still another advantage and objective is accomplished along with those previously mentioned. The result is a more uniform weld bead, or series of adjacent weld beads, with decreased dilution thereof resulting from penetration of the base metal by the electric arc. Increased production capacity is achieved with a smaller, rather than a larger, strip electrode. The shrinkage stress in the weld bead is decreased with a more uniform cross section throughout. No preformed pile of granular material is required, but the present invention utilizes the naturally shaped powder piles produced by meter feeding of the granular directly onto the baseplate. The lower currents that can be utilized create low-intensity arc concentrations on the baseplate for lower penetration. And finally the high ratios of granular-to-electrode desired in bulkwelding may be achieved without the previously mentioned disadvantages occurring.

The present invention is, therefore, well adapted to carry out the objects and attain the ends and advantages mentioned as well as others inherent therein.

What I claimed is:

1. A method of welding a metal surface with a welding head utilized to create a welding arc, including the steps of:
   moving a consumable electrode strip having a thickness of substantially 0.001–0.015 inch into the arc zone of the welding head in a controlled manner,
   moving the welding head in a first direction of travel parallel to said surface at a controlled rate of speed,
   oscillating the strip electrode, said oscillating movement being generally perpendicular to said first direction of travel, and
   depositing alloy granules in said arc zone at a granular-to-electrode weight ratio of substantially 1-to-1 to 3-to-1.

2. The invention of claim 1 wherein the electrode strip moving step is further defined as:
   moving a consumable electrode strip measuring substantially 0.5 inch in width by substantially 0.015 inch in thickness into said arc zone in said controlled manner.

3. The invention of claim 1 wherein the oscillating step is further defined as:
   oscillating the consumable electrode strip through a movement that is at least as wide as the width of the electrode strip.

4. The invention of claim 1 wherein the oscillating step is further defined as:
   oscillating the consumable electrode strip through a movement that is substantially as wide as the width of the electrode strip.

5. The invention of claim 1 wherein the oscillating step is further defined as:
   oscillating the consumable electrode strip through a constant movement of not less than substantially one-half inch in width and not greater than substantially one inch in width.

6. The invention of claim 2 wherein the oscillating step is further defined as:
   oscillating the consumable electrode strip through a constant movement of not less than substantially one-half inch in width and not greater than substantially one inch in width.

7. The invention of claim 2 wherein the oscillating step is further defined as:
   oscillating the consumable electrode strip through a movement that is at least as wide as the width of the electrode strip.

8. The invention of claim 1 wherein said depositing and electrode strip moving steps are further defined as:
   moving a consumable electrode strip having a width of substantially 0.5 inch and a thickness of substantially 0.015 inch, and
   depositing alloy granules in said arc zone at a granular-to-electrode weight ratio of substantially 2-to-1.

9. The invention of claim 4 wherein the oscillating step is further defined as:
   oscillating the consumable electrode strip through a movement that is at least as wide as the width of the electrode strip.

10. The invention of claim 8 wherein the oscillating step is further defined as:
    oscillating the consumable electrode strip through a constant movement of not less than substantially one-half inch in width and not greater than substantially one inch in width.

UNITED STATES PATENT OFFICE
CERTIFICATE OF CORRECTION

Patent No. 3,609,292          Dated September 28, 1971

Inventor(s) Roman F. Arnoldy

It is certified that error appears in the above-identified patent and that said Letters Patent are hereby corrected as shown below:

Column 6, Line 67, cancel "4" and insert -- 8 --.

Signed and sealed this 18th day of July 1972.

(SEAL)
Attest:

EDWARD M. FLETCHER, JR.                ROBERT GOTTSCHALK
Attesting Officer                      Commissioner of Patents